US010482828B2

(12) United States Patent
Zhang

(10) Patent No.: US 10,482,828 B2
(45) Date of Patent: Nov. 19, 2019

(54) METHOD AND APPARATUS FOR CONTROLLING BACKLIGHT BRIGHTNESS, AND LIQUID CRYSTAL DISPLAY DEVICE

(71) Applicants: HISENSE ELECTRIC CO., LTD., Qingdao (CN); HISENSE USA CORPORATION, Suwanee, GA (US); HISENSE INTERNATIONAL CO., LTD., Qingdao (CN)

(72) Inventor: Yuxin Zhang, Qingdao (CN)

(73) Assignees: Hisense Electric Co., Ltd., Qingdao (CN); Hisense USA Corporation, Suwanee, GA (US); Hisense International Co., Ltd., Qingdao (CN)

( * ) Notice: Subject to any disclaimer, the term of this patent is extended or adjusted under 35 U.S.C. 154(b) by 29 days.

(21) Appl. No.: 15/449,888

(22) Filed: Mar. 3, 2017

(65) Prior Publication Data

US 2018/0090076 A1 Mar. 29, 2018

(30) Foreign Application Priority Data

Sep. 28, 2016 (CN) .......................... 2016 1 0861555

(51) Int. Cl.
*G09G 3/36* (2006.01)
*G09G 3/34* (2006.01)
(Continued)

(52) U.S. Cl.
CPC ........... *G09G 3/342* (2013.01); *G09G 3/2007* (2013.01); *G09G 3/3426* (2013.01); (Continued)

(58) Field of Classification Search
CPC .................................................... G09G 3/3607
See application file for complete search history.

(56) References Cited

U.S. PATENT DOCUMENTS

2007/0171217 A1* 7/2007 Tsai ..................... G09G 3/3406 345/207
2008/0180383 A1* 7/2008 Lin ...................... G09G 3/3406 345/102
(Continued)

FOREIGN PATENT DOCUMENTS

CN 105047142 A 11/2015
CN 105118474 A 12/2015
(Continued)

OTHER PUBLICATIONS

The Chinese First Examination Report of corresponding China patent application No. 201610861555.4, dated Apr. 2, 2018.

*Primary Examiner* — Lin Li
(74) *Attorney, Agent, or Firm* — Brinks Gilson & Lione

(57) ABSTRACT

The present application provides a method and an apparatus for controlling backlight brightness, and a liquid crystal display device. The method includes: determining, in an image to be displayed, an image block corresponding to each backlight partition of a plurality of backlight partitions, and determining an initial backlight value for each backlight partition; determining brightness distribution information for pixels in an image partition; determining a backlight adjusting curve corresponding to the image partition; and determining a backlight adjusting factor for a backlight partition corresponding to the image partition according to the initial backlight value of the backlight partition corresponding to the image partition and the backlight adjusting curve corresponding to the image partition, and determining a target backlight value for the backlight partition corresponding to the image partition according to the initial backlight value for the backlight partition and the corresponding backlight adjusting factor.

10 Claims, 14 Drawing Sheets

(51) Int. Cl.
*G02F 1/13* (2006.01)
*G09G 3/20* (2006.01)

(52) U.S. Cl.
CPC ....... *G09G 3/3648* (2013.01); *G09G 2310/08* (2013.01); *G09G 2320/064* (2013.01); *G09G 2320/0646* (2013.01); *G09G 2360/16* (2013.01)

(56) References Cited

U.S. PATENT DOCUMENTS

| | | | | |
|---|---|---|---|---|
| 2009/0066632 | A1 | 3/2009 | Chen | 345/102 |
| 2009/0167670 | A1* | 7/2009 | Peng | G09G 3/3426 345/102 |
| 2010/0295767 | A1* | 11/2010 | Lee | G09G 3/3426 345/102 |
| 2011/0109657 | A1* | 5/2011 | Ogita | G02F 1/1334 345/690 |
| 2011/0115829 | A1* | 5/2011 | Ito | G09G 3/3426 345/690 |
| 2011/0292018 | A1* | 12/2011 | Kubota | G09G 3/3426 345/211 |
| 2013/0222221 | A1* | 8/2013 | An | G09G 3/3426 345/102 |
| 2013/0314458 | A1* | 11/2013 | Murai | G09G 3/3406 345/691 |
| 2015/0365621 | A1* | 12/2015 | Zhang | G09G 5/005 348/791 |
| 2016/0217752 | A1* | 7/2016 | Shin | G09G 3/3607 |
| 2017/0047022 | A1* | 2/2017 | Ikeda | G09G 3/36 |

FOREIGN PATENT DOCUMENTS

| | | | |
|---|---|---|---|
| CN | 105139809 | A | 12/2015 |
| CN | 105161064 | A | 12/2015 |
| CN | 105185353 | A | 12/2015 |
| CN | 105336297 | A | 2/2016 |

* cited by examiner

METHOD AND APPARATUS FOR CONTROLLING BACKLIGHT BRIGHTNESS, AND LIQUID CRYSTAL DISPLAY DEVICE

CROSS-REFERENCE TO RELATED APPLICATIONS

This application claims priority to Chinese Patent Application No. 201610861555.4, filed with the Chinese Patent Office on Sep. 28, 2016 and entitled "METHOD AND APPARATUS FOR CONTROLLING BACKLIGHT BRIGHTNESS, AND LIQUID CRYSTAL DISPLAY DEVICE", which is hereby incorporated by reference in its entirety.

TECHNICAL FIELD

Embodiments of this application relate to the technical field of liquid crystal display, and in particular relate to a method and an apparatus for controlling backlight brightness, and a liquid crystal display device.

BACKGROUND

At present, a backlight assembly in a liquid crystal display device typically includes multiple backlight partitions, and by adjusting brightness values for individual backlight partitions, image displaying effect can be adjusted.

During a practical application, before an image (or a frame) is displayed on a liquid crystal display (LCD) device, image blocks corresponding to individual backlight partitions are identified in the image, and the brightness values for individual backlight partitions are determined according to grayscale values of pixels in the image blocks corresponding to individual backlight partitions and a fixed backlight adjusting curve.

SUMMARY

Embodiments of this application provide a method and an apparatus for controlling backlight brightness, and a liquid crystal display device.

In a first aspect, embodiments of this application provide a method for controlling backlight brightness, including:

determining, in an image to be displayed, an image block corresponding to each backlight partition of a plurality of backlight partitions, and determining an initial backlight value for each backlight partition according to grayscale values of pixels in the image block corresponding to the backlight partition;

determining brightness distribution information for pixels in an image partition according to grayscale values of the pixels in the image partition corresponding to the image to be displayed;

determining a backlight adjusting curve corresponding to the image partition according to the brightness distribution information for the pixels in the image partition, where the backlight adjusting curve records a mapping between the initial backlight value and a backlight adjusting factor; and determining a backlight adjusting factor for a backlight partition corresponding to the image partition according to the initial backlight value of the backlight partition corresponding to the image partition and the backlight adjusting curve corresponding to the image partition, and determining a target backlight value for the backlight partition corresponding to the image partition according to the initial backlight value for the backlight partition and the corresponding backlight adjusting factor.

In a second aspect, embodiments of this application provide an apparatus for controlling backlight brightness, including: a memory storing instructions; a processor coupled with the memory and configured to execute instructions stored in the memory, and the processor is configured to:

determine, in an image to be displayed, an image block corresponding to each backlight partition of a plurality of backlight partitions, and determine an initial backlight value for each backlight partition according to grayscale values of pixels in the image block corresponding to the backlight partition;

determine brightness distribution information for pixels in an image partition according to grayscale values of the pixels in the image partition corresponding to the image to be displayed;

determine a backlight adjusting curve corresponding to the image partition according to the brightness distribution information for the pixels in the image partition, where the backlight adjusting curve records a mapping between the initial backlight value and a backlight adjusting factor; and determine a backlight adjusting factor for a backlight partition corresponding to the image partition according to the initial backlight value of the backlight partition corresponding to the image partition and the backlight adjusting curve corresponding to the image partition, and determine a target backlight value for the backlight partition corresponding to the image partition according to the initial backlight value for the backlight partition and the corresponding backlight adjusting factor.

In a third aspect, embodiments of this application provide a liquid crystal display (LCD) device that includes a liquid crystal panel, a backlight assembly, and an apparatus for controlling backlight brightness, where the apparatus for controlling the backlight brightness is configured to control backlight source brightness for backlight partitions in the backlight assembly, so that the backlight partitions in the backlight assembly illuminate the liquid crystal panel according to the corresponding backlight source brightness; and the apparatus for controlling the backlight brightness includes: a memory storing instructions; a processor coupled with the memory and configured to execute instructions stored in the memory, and the processor is configured to:

determine, in an image to be displayed, an image block corresponding to each backlight partition of a plurality of backlight partitions, and determine an initial backlight value for each backlight partition according to grayscale values of pixels in the image block corresponding to the backlight partition;

determine brightness distribution information for pixels in an image partition according to grayscale values of the pixels in the image partition corresponding to the image to be displayed;

determine a backlight adjusting curve corresponding to the image partition according to the brightness distribution information for the pixels in the image partition, where the backlight adjusting curve records a mapping between the initial backlight value and a backlight adjusting factor; and determine a backlight adjusting factor for a backlight partition corresponding to the image partition according to the initial backlight value of the backlight partition corresponding to the image partition and the backlight adjusting curve corresponding to the image partition, and determine a target backlight value for the backlight partition corresponding to the image partition according to the initial backlight value for the backlight partition and the corresponding backlight adjusting factor.

BRIEF DESCRIPTION OF DRAWINGS

To describe the technical resolutions of embodiments in the present application or in the prior art more clearly, a brief introduction will be given hereinafter to the accompany drawings needed for describing the embodiments or the prior art. Apparently, the accompanying drawings in the following description illustrate merely some embodiments of the present application, and persons of ordinary skill in the art may still derive other drawings from these drawings without creative effort.

DETAILED DESCRIPTION

In order to make the purposes, the technical solutions and the advantages of the present application more apparent, a clear and comprehensive description will be given to the technical solution of the present application with reference to the accompanying drawings. It is evident that the embodiments are only some exemplary embodiments of the present application, and the present application is not limited to such embodiments. Other embodiments that those skilled in the art obtain based on embodiments of the present application also all within the protection scope of the present application.

Figure 1:
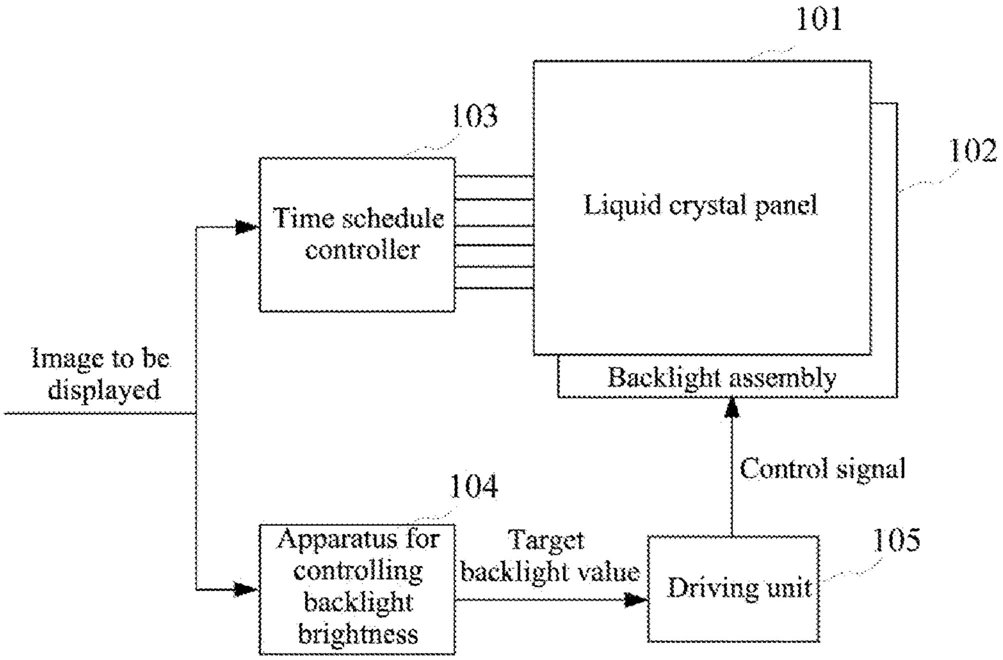
FIG. 1 is an application scenario schematic diagram of a method for controlling backlight brightness according to the present application.

FIG. 1 is an application scenario schematic diagram of a method for controlling backlight brightness according to the present application. Referring to FIG. 1, there includes a liquid crystal panel 101, a backlight assembly 102, a time schedule controller 103, an apparatus for controlling backlight brightness 104, and a driving unit 105, where the liquid crystal panel 101 is used for displaying an image, the backlight assembly 102 is located on a rear side of the liquid crystal panel and includes multiple backlight partitions (not shown), each backlight partition is capable of emitting light with various brightness to illuminate the liquid crystal panel 101.

When an image to be displayed needs to be displayed, the apparatus for controlling backlight brightness 104 will determine target backlight values for the backlight partitions according to grayscale values of pixels in the image to be displayed, and send the target backlight values for the backlight partitions thus determined to the driving unit 105, enabling the driving unit 105 to generate controlling signals for controlling the backlight partitions according to the target backlight values for the backlight partitions, and to control the brightness values for individual backlight partitions via the controlling signals. Also, the image to be displayed is sent to the time schedule controller 103 which will follow a preset time schedule to send the image to be displayed to the liquid crystal panel 101 for displaying the image. While the image is displayed on the liquid crystal panel 101, the individual backlight partitions in the backlight assembly 102 emit light at brightness corresponding to the image to be displayed, realizing adjustment over the displaying effect of the image to be displayed.

Now, technical solutions presented in this application will be described in detail by means of some embodiments. The following embodiments may be recombined, and same or similar concepts or processes might not be repeated in some embodiments.

Figure 2:
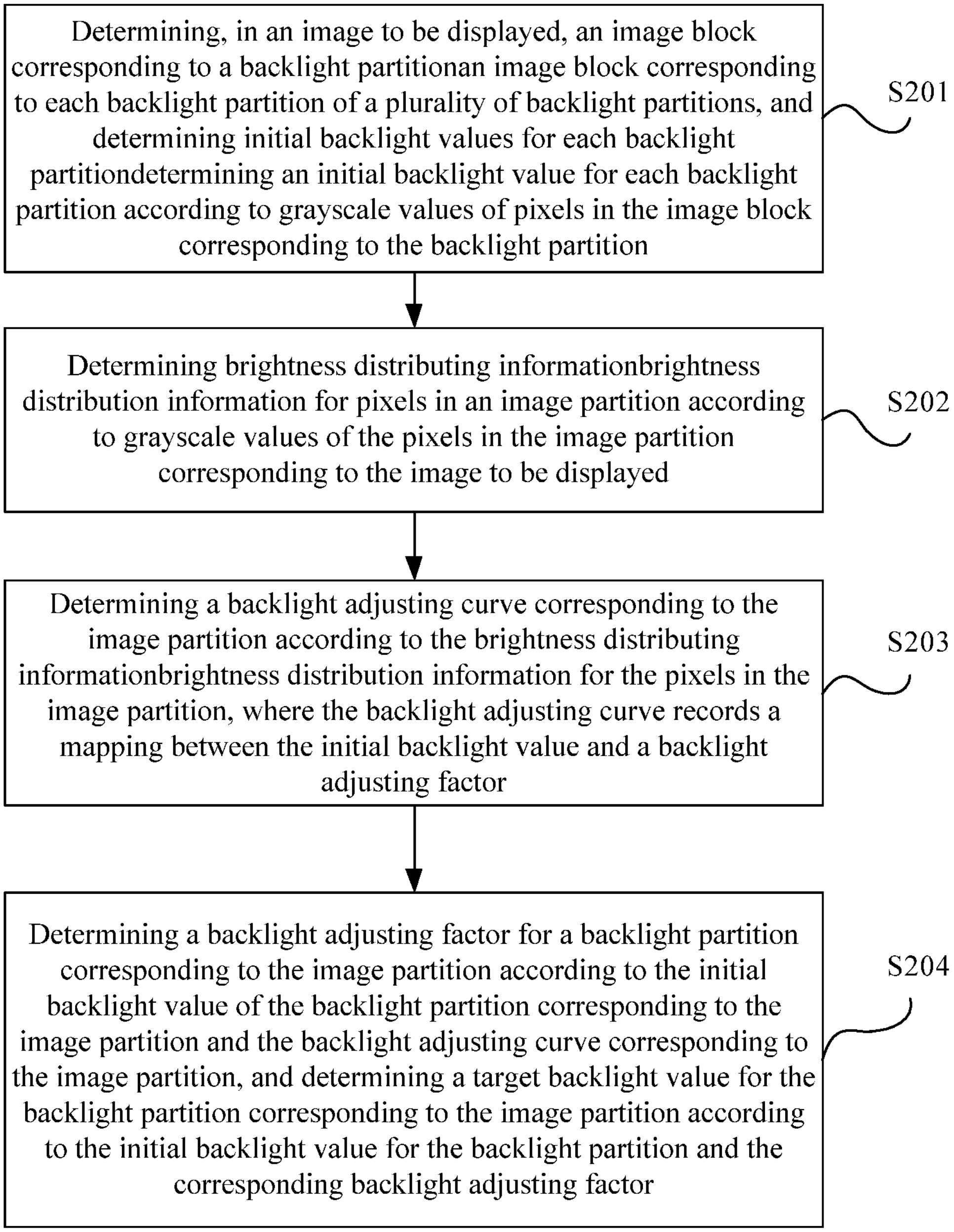
FIG. 2 is a flowchart of a method for controlling backlight brightness according to the present application.

FIG. 2 is a flowchart of a method for controlling backlight brightness according to the present application. Referring to FIG. 2, the method may include:

S201: determining, in an image to be displayed, an image block corresponding to each backlight partition of a plurality of backlight partitions, and determining an initial backlight value for each backlight partition according to grayscale values of pixels in the image block corresponding to the backlight partition;

S202: determining brightness distribution information for pixels in an image partition according to grayscale values of the pixels in the image partition corresponding to the image to be displayed;

S203: determining a backlight adjusting curve corresponding to the image partition according to the brightness distribution information for the pixels in the image partition, where the backlight adjusting curve records a mapping between the initial backlight value and a backlight adjusting factor; and S204: determining a backlight adjusting factor for a backlight partition corresponding to the image partition according to the initial backlight value of the backlight partition corresponding to the image partition and the backlight adjusting curve corresponding to the image partition, and determining a target backlight value for the backlight partition corresponding to the image partition according to the initial backlight value for the backlight partition and the corresponding backlight adjusting factor.

The executive subject matter of the embodiments in this application may be an apparatus for controlling backlight brightness. Optionally, the apparatus for controlling backlight brightness may be arranged within the LCD device. Optionally, the apparatus for controlling backlight brightness may be implemented through software and/or hardware.

In embodiments of this application, a target backlight value needs to be determined for each backlight partition by the apparatus for controlling backlight brightness according to the method shown in the embodiment of FIG. 2 while the LCD device is displaying static images or videos, or each image (or each frame in a video). One or more image partitions may be associated with an image to be displayed, and an image partition is considered as the image to be displayed when only one image partition can be associated. When multiple image partitions are associated, brightness distribution information may be determined for pixels in each image partition according to grayscale values of the pixels in the image partition. That is, brightness distribution information may be separately determined for the pixels in each image partition according to step 202. Additionally, before the above step, the multiple image partitions corresponding to the image to be displayed may also be determined, which will be explained in detail later. Accordingly, when there are multiple image partitions, and brightness distribution information has been determined for the pixels in each image partition, a backlight adjusting curve corresponding to each image partition can be determined according to the brightness distribution information for the pixels in the image partition. Then, backlight adjusting factors are determined for backlight partitions corresponding to each image partition according to initial backlight values of backlight partitions corresponding to each image partition and the backlight adjusting curves corresponding to each image partition, and target backlight values are determined for each backlight partition according to the initial backlight values for each backlight partition and the corresponding backlight adjusting factors.

The apparatus for controlling backlight brightness follows the same procedure in determining target backlight values for backlight partitions of all image partitions associated with the image to be displayed. Now, the method shown in the embodiment of FIG. 2 is described in detail by example in which an apparatus for controlling backlight brightness determines a target backlight value for a backlight partition corresponding to any one of the image partitions.

In a practical application, an apparatus for controlling backlight brightness begins from determining image blocks corresponding to backlight partitions in an image to be displayed when the apparatus for controlling backlight brightness needs to determine target backlight values for the backlight partitions of the image partitions corresponding to the image to be displayed, where the image to be displayed includes multiple image blocks, where one backlight partition corresponds to one image block.

The apparatus for controlling backlight brightness can determine the image blocks corresponding to individual backlight partitions according to their dimensions and locations in the backlight assembly, where the dimension and the location taken up by the backlight partition in the backlight assembly may be equal to the dimension and the location taken up by the image block corresponding to the backlight partition in the image to be displayed. Of course, the dimensions may also be unequal according to an actual requirement. For instance, part of an image block of a backlight partition may overlap with an image block of a neighboring backlight partition, which helps creating smooth transition between the neighboring image blocks.

As an example, assuming that a backlight assembly includes 16*9 backlight partitions, then the image to be displayed may be partitioned into 16*9 image blocks, and individual backlight partitions can be bijectively paired with individual image blocks according to a row and a column of the backlight partition and those of the image block. Illustratively, the backlight partition at row N and column M may be paired with the image block at row N and column M.

After determining the image block corresponding to each backlight partition, the apparatus for controlling backlight brightness determines an initial backlight value for each backlight partition according to grayscale values of pixels in the image block corresponding to each backlight partition. Optionally, the apparatus for controlling backlight brightness may determine the initial backlight values for each backlight partition through various feasible implementations. As an example, the apparatus for controlling the backlight brightness may determine the initial backlight value for a backlight partition according to an average of the grayscale values of the pixels in the image block, or a weighted value thereof. Of course, other means may also be employed to determine the initial backlight values for each backlight partition, which will not be limited herein.

Figure 5:
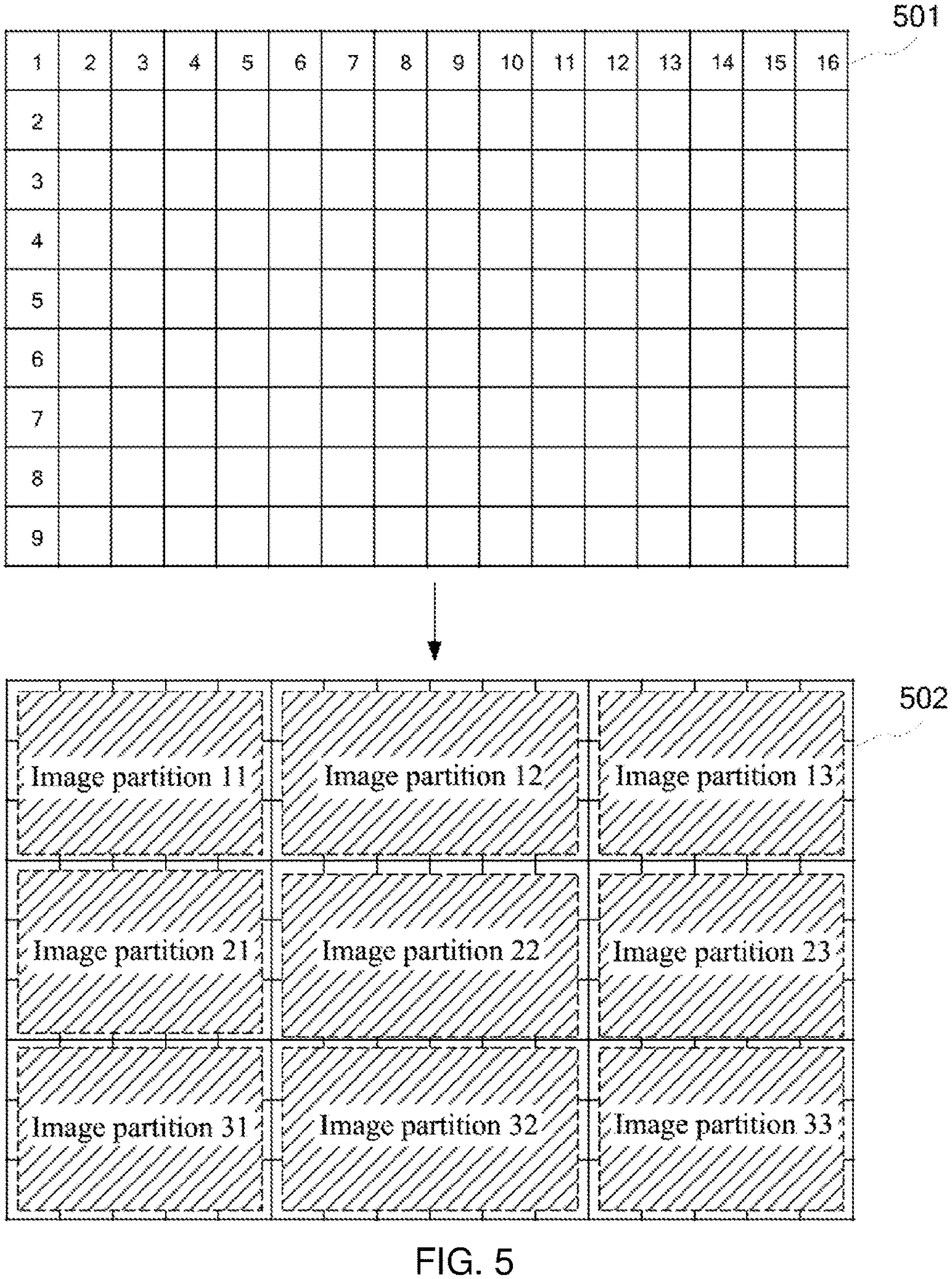
FIG. 5 is a first partition schematic diagram of backlight partitions and image partitions according to the present application.
Figure 6:
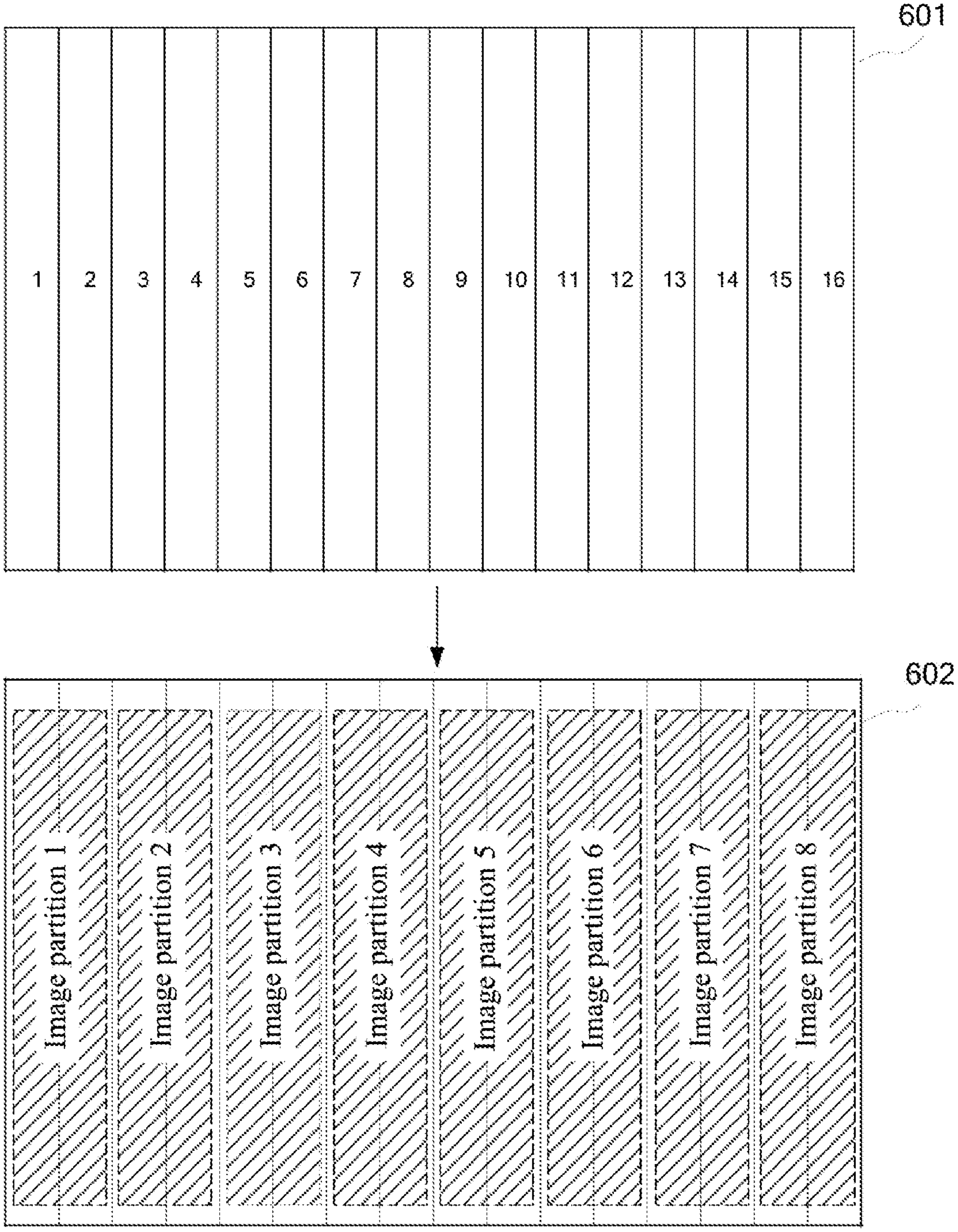
FIG. 6 is a second partition schematic diagram of backlight partitions and image partitions according to the present application.

When an image to be displayed is associated with multiple image partitions, the apparatus for controlling backlight brightness can further determine the multiple image partitions for the image to be displayed, with each image partition corresponding to one or more backlight partitions. As illustrated in FIGS. 5 and 6, one image partition respectively corresponds to multiple backlight partitions. Of course, one image partition may also correspond to one backlight partition.

The apparatus for controlling backlight brightness determines brightness distribution information for the pixels in individual image partitions according to the grayscale values of the pixels in that image partition, where the brightness distribution information refers to a quantitative distribution of image partition pixels of the image partition in various brightness ranges, and can indicate that the majority of the image details included in the image partition are of low brightness or high brightness.

Optionally, the apparatus for controlling backlight brightness may statistically analyze the grayscale values of the pixels in an image partition to create a grayscale histogram for the image partition (such as those illustrated in FIGS. 8*a*, 9*a* and 9*c*), and determine the brightness distribution information according to the grayscale histogram of the image partition.

Figure 8A:
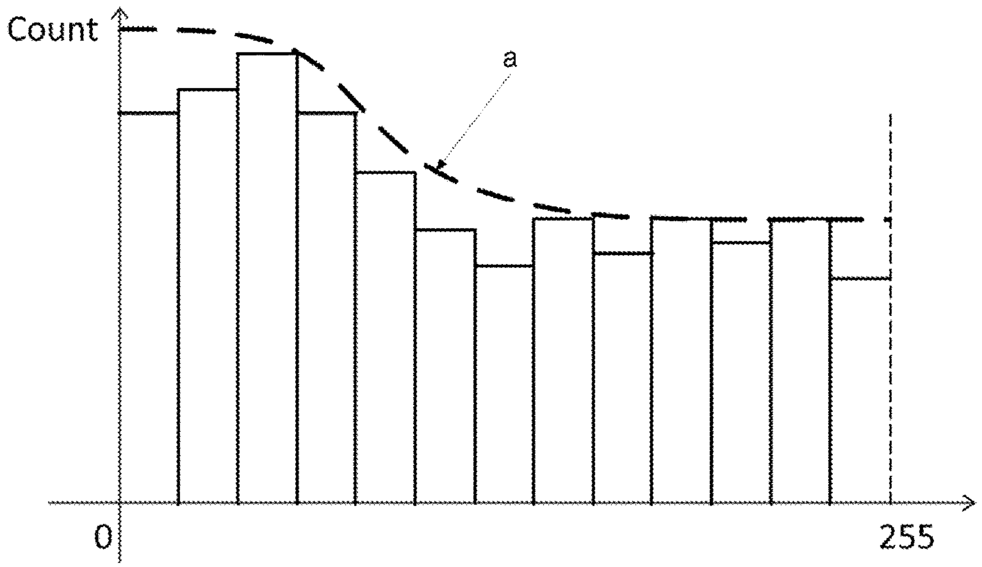
FIG. 8*a* is a first grayscale histogram according to the present application.

For instance, the brightness distribution information presented in FIG. 8*a* indicates that more pixels fall into the low brightness ranges, which means a larger part of the image details are of low brightness, and thus backlight values need to be increased for the partitions with relatively low backlight brightness, so that image details can be better rendered for those backlight partitions with low brightness. Additionally, less pixels are shown to fall into the high brightness ranges, which means a smaller part of the image details are of high brightness, and thus the backlight values can be reasonably decreased for the partitions with relatively high backlight brightness, so that power consumption can be reduced.

Figure 9A:
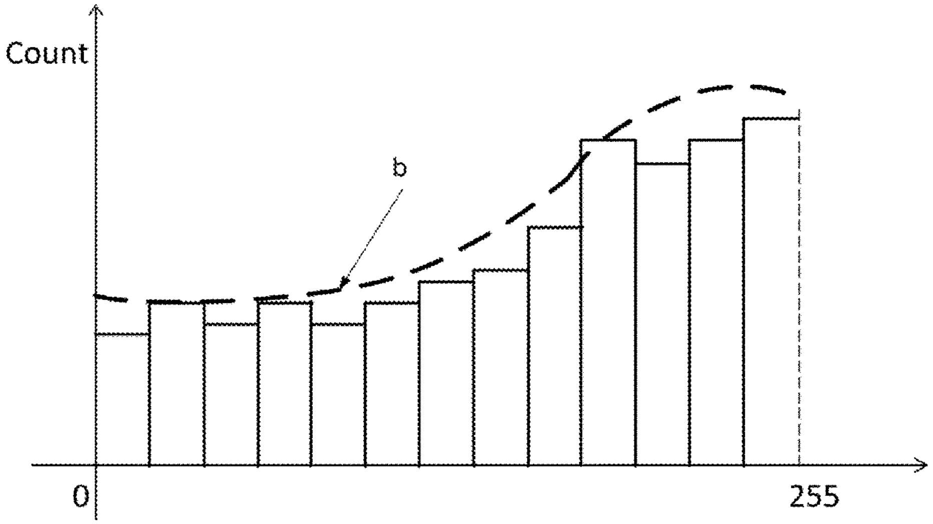
FIG. 9*a* is a second grayscale histogram according to the present application.

For instance, the brightness distribution information presented in FIG. 9*a* indicates that more pixels fall into the high brightness ranges, which means a larger part of the image details are of high brightness, and thus the backlight values need to be increased for the partitions with relatively high backlight brightness, so that image details can be better rendered for those backlight partitions with high brightness. Additionally, less pixels are shown to fall into the low brightness ranges, which means a smaller part of the image details are of low brightness, and thus the backlight values can be reasonably decreased for the partitions with relatively low backlight brightness, so that the contrast can be further improved.

Figure 9B:
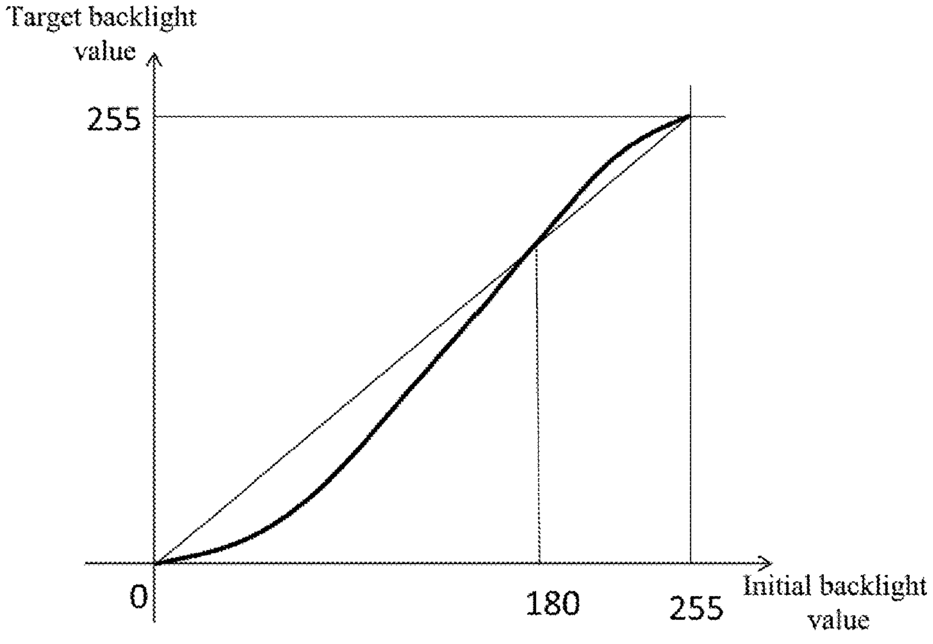
FIG. 9*b* is an S-shaped curve according to the present application.
Figure 9C:
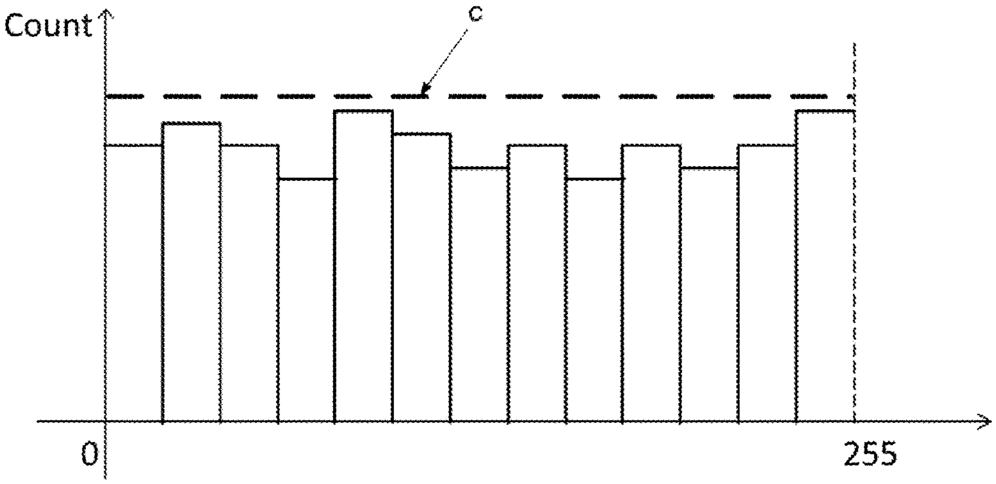
FIG. 9*c* is a third grayscale histogram according to the present application.

For instance, the brightness distribution information presented in FIG. 9*c* indicates that the pixels demonstrates a relatively even distribution among each of the brightness ranges, and thus a curved adjustment to the backlight values may be unnecessary for the backlight partitions.

After determining the brightness distribution information for the pixels in the image partition, the apparatus for controlling backlight brightness determines the backlight adjusting curve corresponding to the image partition according to the brightness distribution information, where the backlight adjusting curve records a mapping between the initial backlight value and a backlight adjusting factor. When an image to be displayed is associated with multiple image partitions, the apparatus for controlling backlight brightness can separately obtain the brightness distribution information for the pixels in each image partition following the same approach, and then proceed to determine the backlight adjusting curve corresponding to each image partition according to the brightness distribution information. Optionally, the backlight adjusting factor corresponding to each brightness range may be determined according to the number of pixels corresponding to each brightness range in the brightness distribution information, and the backlight adjusting curve corresponding to the image partition may be determined according to the backlight adjusting factor corresponding to each brightness range. A brightness range with more pixels corresponds to a larger backlight adjusting factor, and vice versa. For instance, any brightness range will be associated with a backlight adjusting factor of greater than one when the number of the pixels in that range is greater than an average number, or smaller than one when the number of the pixels in that range is smaller than the average number, or equal to one when the number of the pixels in that range is equal to the average number.

Optionally, different brightness distribution information corresponds to different backlight adjusting curves, and the mapping between the brightness distribution information and the backlight adjusting curve may be predefined, where the backlight adjusting factors corresponding to the initial backlight values can be obtained from a backlight adjusting curve.

After determining the backlight adjusting curve corresponding to the image partition, the apparatus for controlling backlight brightness determines the backlight adjusting factors for the backlight partitions corresponding to the image partition according to the backlight adjusting curve. Optionally, the apparatus for controlling backlight brightness may, according to initial backlight values of individual backlight partitions, obtain corresponding backlight adjusting factors from the backlight adjusting curve, and determine target backlight values for the individual backlight partitions according to the initial backlight values of the backlight partitions and the corresponding backlight adjusting factors. Optionally, the product of the initial backlight value for the backlight partition and the corresponding backlight adjusting factor may be taken as the target backlight value for the backlight partition.

The method for controlling backlight brightness according to the embodiments of this application, when the apparatus for controlling backlight brightness needs to determine target backlight values for backlight partitions of the image partition corresponding to the image to be displayed, the apparatus for controlling backlight brightness will begin from determining the initial backlight values for the backlight partitions according to the grayscale values of the pixels in the image blocks corresponding to the backlight partitions, then proceed to determining the backlight adjusting curve corresponding to the image partition according to the brightness distribution information of the pixels in the image partition of the image to be displayed, and adjusting the initial backlight values for the backlight partitions according to the backlight adjusting curve, so as to determine the target backlight values for the backlight partitions corresponding to the image partition. During the aforementioned process, the brightness distribution information for the pixels in the image partition can reflect a distribution characteristics of the number of the pixels among brightness ranges for the image partitions, and different brightness distribution information is associated with different backlight adjusting curves. By adjusting the initial backlight values for each backlight partition according to the corresponding backlight adjusting curve, adjustments can be realized for the initial backlight value of the backlight partition corresponding to the image partition according to the characteristics of the brightness distribution information of the image partition. Thus, the target backlight value obtained through the adjustments can be matched with the brightness characteristics of the image partition, thereby improving the displaying effect for the image.

On the basis of the embodiment illustrated in FIG. 2, optionally, the initial backlight values can be determined for the backlight partitions according to the grayscale values of the pixels in the image blocks corresponding to the backlight partitions (the S201 in the embodiment shown in FIG. 2) through the following feasible implementations, in which the apparatus for controlling backlight brightness follows the same procedure to determine the initial backlight value for each backlight partition. Now, a process is described in detail, referring to an embodiment shown in FIG. 3, with respect to determining an initial backlight value for any one of the backlight partitions.

Figure 3:
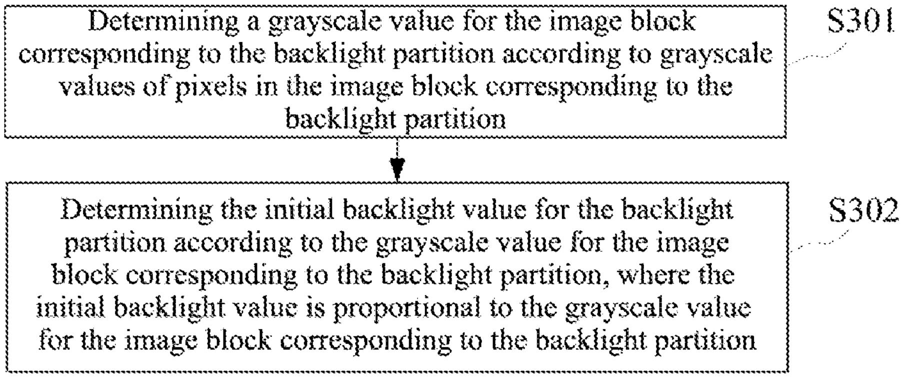
FIG. 3 is a flowchart of a method for determining an initial backlight value according to the present application.

FIG. 3 is a flowchart of a method for determining an initial backlight value according to the present application. Referring to FIG. 3, the method may include:

S301: determining a grayscale value for the image block corresponding to the backlight partition according to grayscale values of pixels in the image block corresponding to the backlight partition; and S302: determining the initial backlight value for the backlight partition according to the grayscale value for the image block corresponding to the backlight partition, where the initial backlight value is proportional to the grayscale value for the image block corresponding to the backlight partition.

In the embodiment shown in FIG. 3, when the apparatus for controlling backlight brightness needs to find out the initial backlight value for a backlight partition, the apparatus for controlling backlight brightness begins from obtaining the grayscale values for the pixels in the image block corresponding to the backlight partition, then proceed to determine the grayscale value for the image block corresponding to the backlight partition according to the grayscale values for the pixels in the image block corresponding to the backlight partition. Optionally, the grayscale value for the image block may be determined to be the average value of the grayscale values for the pixels in the image block, or the weighted value of the same. Of course, the grayscale value for the image block corresponding to the backlight partition may also be determined through other implementations, which will not be limited herein.

The apparatus for controlling backlight brightness determines the initial backlight value for the backlight partition according to the grayscale value for the image block corresponding to the backlight partition, such that the initial backlight value is proportional to the grayscale value for the image block corresponding to the backlight partition. Optionally, the apparatus for controlling backlight brightness may determine the initial backlight value for the backlight partition according to the grayscale value for the image block corresponding to the backlight partition and predefined weight coefficients. Optionally, the predefined weight coefficients may be one, two, or the like, and may be configured according to the actual requirement in practical applications.

Now, the method of the embodiment shown in FIG. 3 will be detailed through some embodiments.

Illustratively, a backlight partition 1 corresponds to an image block 1 including 5*5 pixels, with grayscale values of the pixels thereof shown in Table 1:

TABLE 1

| | | | | |
|---|---|---|---|---|
| 120 | 130 | 125 | 145 | 200 |
| 220 | 200 | 125 | 130 | 145 |
| 145 | 120 | 130 | 125 | 145 |
| 145 | 200 | 130 | 125 | 145 |
| 200 | 130 | 125 | 210 | 220 |

The apparatus for controlling backlight brightness obtains the average grayscale value, which is 145, for the pixels shown in Table 1, and determines the average grayscale value 145 to be the grayscale value for the image block 1.

Assuming that the predefined weight coefficient is 1, the backlight value for the backlight partition can be determined to be 145*1=145.

In the aforementioned example, the backlight value may also be determined according to a weighted sum of the average grayscale value for the pixels and a maximum pixel value. As an example, assuming that the predefined weight is 0.8 for the preset average value, and the weight is 1−0.8=0.2 for the maximum pixel value, the backlight value will be 145*0.8+220*0.2=160 for the backlight partition 1.

During the aforementioned process, the grayscale value for the image block corresponding to the backlight partition is determined at first, then the initial backlight value is determined for the backlight partition according to the grayscale value for the image block, and the initial backlight value is proportional to the grayscale value for the image block, thereby ensuring a brightness fit between the backlight partitions and the image to be displayed, further improving an image displaying effect.

Figure 4:
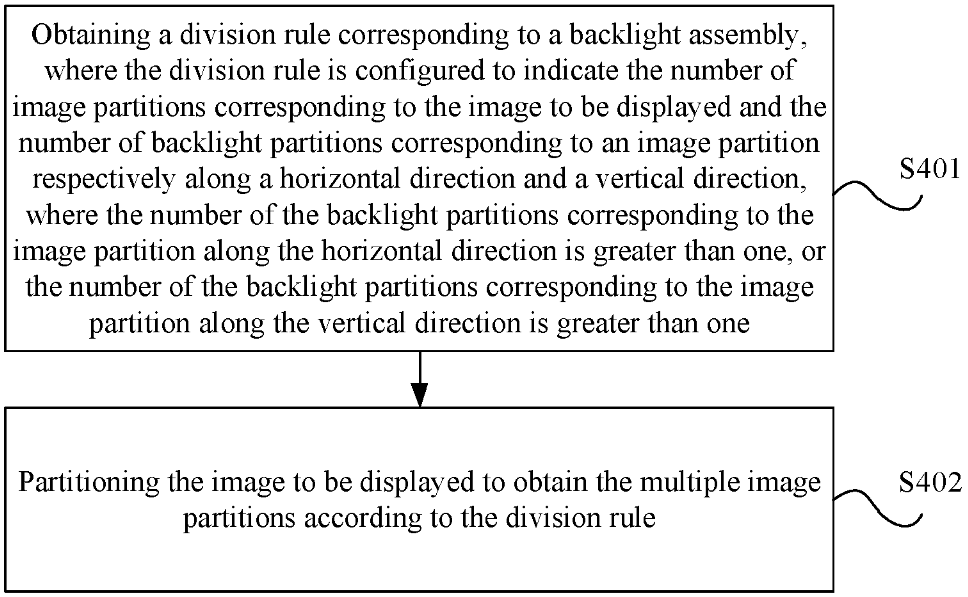
FIG. 4 is a flowchart of a method for determining a backlight partition according to the present application.

On the basis of any of the aforementioned embodiments, optionally, when an image to be displayed is associated with multiple image partitions, the multiple image partitions can be determined for the image to be displayed through the following feasible implementations, as can be seen in the embodiment shown in FIG. 4.

FIG. 4 is a flowchart of a method for determining a backlight partition according to the present application. Referring to FIG. 4, the method may include:

S401: obtaining a division rule corresponding to a backlight assembly, where the division rule is configured to indicate the number of image partitions corresponding to the image to be displayed and the number of backlight partitions corresponding to an image partition respectively along a horizontal direction and a vertical direction, where the number of the backlight partitions corresponding to the image partition along the horizontal direction is greater than one, or the number of the backlight partitions corresponding to the image partition along the vertical direction is greater than one; and S402: partitioning the image to be displayed to obtain the multiple image partitions according to the division rule.

In the embodiment illustrated in FIG. 4, the division rule corresponding to a backlight assembly for partitioning the image to be displayed may differ when the backlight assembly divides the backlight partitions in different ways. Optionally, the division rule corresponding to each backlight assembly may be pre-configured by a user. In this case, the division rule is used for indicating the number of the image partitions corresponding to the image to be displayed (or the number of the image partitions that the image to be displayed is segmented into), as well as the numbers of the backlight partitions corresponding to each image partition along the horizontal direction and the vertical direction. In this case, the number of the backlight partitions corresponding to the image partition along the horizontal direction is greater than one, or the number of the backlight partitions corresponding to the image partition along the vertical direction is greater than one. Optionally, only the number of the backlight partitions corresponding to the image partition along the horizontal direction is greater than one, or only the number of the backlight partitions corresponding to the image partition along the vertical direction is greater than one, or the numbers of the backlight partitions corresponding to the image partition along both the horizontal and vertical directions are greater than one.

When the apparatus for controlling backlight brightness needs to partition the image to be displayed, the apparatus for controlling backlight brightness obtains the division rule corresponding to the backlight assembly, and partitions the image to be displayed accordingly, thus obtaining the multiple image partitions.

Now, the division rule will be detailed with respect to FIGS. 5 and 6.

FIG. 5 is a first partition schematic diagram of backlight partitions and image partitions according to the present application. Referring to FIG. 5, there includes a backlight partition configuration diagram 501 and an image partition configuration diagram 502, where:

as can be seen from the backlight partition configuration diagram 501, the backlight assembly includes 16*9 backlight partitions. Assuming that the division rule corresponding to the backlight assembly is to divide the image to be displayed into nine image partitions designated as Image Partition 11 to Image Partition 33, the numbers of the backlight partitions corresponding to the image partition along the horizontal and vertical directions are as shown in Table 2:

TABLE 2

| Image Partition ID | Number of backlight partitions along the horizontal | Number of backlight partitions along the vertical |
|---|---|---|
| Image Partition 11 | 5 | 3 |
| Image Partition 12 | 6 | 3 |
| Image Partition 13 | 5 | 3 |
| Image Partition 21 | 5 | 3 |
| Image Partition 22 | 6 | 3 |
| Image Partition 23 | 5 | 3 |
| Image Partition 31 | 5 | 3 |
| Image Partition 32 | 6 | 3 |
| Image Partition 33 | 5 | 3 |

According to the numbers of the backlight partitions along the horizontal and vertical directions of each image partition shown in Table 2, the apparatus for controlling backlight brightness partitions the image to be displayed to create the multiple image partitions illustrated in the image partition configuration diagram 502.

FIG. 6 is a second partition schematic diagram of backlight partitions and image partitions according to the present application. Referring to FIG. 6, which includes a backlight partition configuration diagram 601 and an image partition configuration diagram 602, it can be seen from the backlight partition configuration diagram 601 that the backlight assembly includes 1*16 backlight partitions. Assuming that the division rule corresponding to the backlight assembly is to divide the image to be displayed into eight image partitions designated as Image Partition 1 to Image Partition 8, with each image partition corresponding to two backlight partitions. That is, each image partition corresponds to two backlight partitions along the horizontal direction, and one backlight partition along the vertical direction.

According to the numbers of the backlight partitions along the horizontal and vertical directions of each image partition, the apparatus for controlling backlight brightness partitions the image to be displayed to create the multiple image partitions illustrated in the image partition configuration diagram 602.

In the aforementioned process, the division rule corresponding to the backlight assembly correlates with the way in which the backlight assembly configures the backlight partitions, so that the image partitions, which are obtained by dividing the image to be displayed according to the division rule, can correspond to the way for configuring the backlight partitions, thereby rendering the image partitions obtained through partitioning more properly.

On the basis of any of the above embodiments, the backlight adjusting curve corresponding to the image partition can be determined according to the brightness distribution information of the pixels in the image partition (the S203 in the embodiment shown in FIG. 2) through the following feasible implementations, in which the apparatus for controlling backlight brightness follows the same procedure to determine the backlight adjusting curves for the backlight partitions corresponding to each image partition. Now, a process is detailed, referring to embodiments shown in FIGS. 7 to 10, with respect to determining a backlight adjusting curve for the backlight partitions corresponding to any of the backlight partitions.

Figure 7:
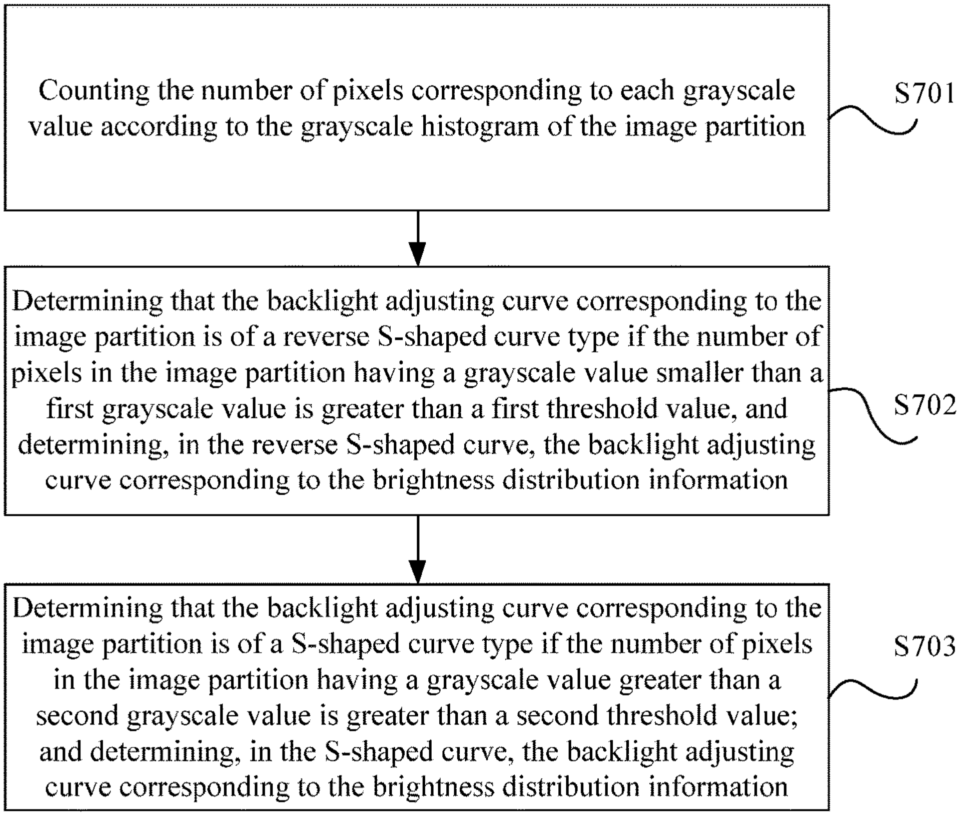
FIG. 7 is a first flowchart of a method for determining a backlight adjusting curve according to the present application.

FIG. 7 is a first flowchart of a method for determining a backlight adjusting curve according to the present application. Referring to FIG. 7, the method may include:

S701: counting the number of pixels corresponding to each grayscale value according to the grayscale histogram of the image partition;

S702: determining that the backlight adjusting curve corresponding to the image partition is of a reverse S-shaped curve type if the number of pixels in the image partition having a grayscale value smaller than a first grayscale value is greater than a first threshold value, and determining, in the reverse S-shaped curve, the backlight adjusting curve corresponding to the brightness distribution information, wherein the reverse S-shaped curve is configured to increase a backlight value for a backlight partition having a backlight value smaller than a first backlight value, and to decrease a backlight value for a backlight partition having a backlight value greater than a second backlight value; or

S703: determining that the backlight adjusting curve corresponding to the image partition is of a S-shaped curve type if the number of pixels in the image partition having a grayscale value greater than a second grayscale value is greater than a second threshold value; and determining, in the S-shaped curve, the backlight adjusting curve corresponding to the brightness distribution information, wherein the S-shaped curve is configured to increase a backlight value for a backlight partition having a backlight value greater than a third backlight value, and to decrease a backlight value for a backlight partition having a backlight value smaller than a fourth backlight value.

In the embodiment shown in FIG. 7, when the apparatus for controlling backlight brightness needs to determine the backlight adjusting curve for backlight partitions corresponding to an image partition, the apparatus for controlling backlight brightness will count the number of the pixels corresponding to each grayscale value according to the grayscale histogram of the image partition and the grayscale values of the pixels in the image partition.

After obtaining the number of the pixels corresponding to each grayscale value, the apparatus for controlling backlight brightness accordingly determines the type of the backlight adjusting curve, and determines, in that type of backlight adjusting curve, the backlight adjusting curve corresponding to the brightness distribution information.

The type of the backlight adjusting curve corresponding to the image partition will be determined to be a reverse S-shaped curve if the number of the pixels in the image partition having a grayscale value smaller than the first grayscale value is greater than the first threshold value; and the backlight adjusting curve corresponding to the brightness distribution information will be determined in the reverse S-shaped curve, where the reverse S-shaped curve is configured to increase a backlight value for a backlight partition having a backlight value smaller than the first backlight value, and to decrease a backlight value for a backlight partition having a backlight value greater than the second backlight value, where the second backlight value is not smaller than the first backlight value. Optionally, a liquid crystal display panel of 8 bit features grayscale values of 0-255 (28), and accordingly, the first backlight value may be 256/2=128. Of course, the first backlight value may equally be 125, 130 or the like, and may be configured according to the actual need in practical applications. Optionally, the first threshold value is greater than half of the pixel count included in the image partition. As an example, the first threshold value may be, e.g., two thirds of the pixel count included in the image partition, and may be configured according to the actual need in practical applications.

Optionally, the reverse S-shaped curve encompasses various kinds of backlight adjusting curves, each with a different reverse S curvature. Optionally, the brightness distribution information and the backlight adjusting curve may have such a mapping in between that enables the apparatus for controlling backlight brightness to determine, in the reverse S-shaped curve, the backlight adjusting curve corresponding to the brightness distribution information according to the mapping.

When the number of the pixels in the image partition having a grayscale value smaller than the first grayscale value is greater than the first threshold value, most pixels in the image partition are low brightness images, thus a larger part of the image details are of low brightness. By adjusting the backlight values for the backlight partitions through the reverse S-shaped curve, details in a dim scene can be enhanced, and the image partition can be presented in a more harmonious way, while a power consumption can be reduced because the backlight brightness can be reasonably decreased for the backlight partitions with relatively high brightness.

In case the number of the pixels in the image partition having a grayscale value greater than the second grayscale value is greater than the second threshold value, the type of the backlight adjusting curve corresponding to the image partition will be determined to be a an S-shaped curve, where the S-shaped curve is configured to increase a backlight value for a backlight partition having a backlight value greater than the third backlight value, and to decrease a backlight value for a backlight partition having a backlight value smaller than the fourth backlight value. In this case, the third backlight value is not smaller than the fourth backlight value. Optionally, a liquid crystal display panel of 8 bit features grayscale values of 0-255 (28), and accordingly, the second backlight value may be 256/2=128. Of course, the second backlight value may equally be 125, 130 or the like, and may be configured according to the actual need in practical applications. Optionally, the second threshold value is greater than half of the pixel count included in the image partition. As an example, the second threshold value may be, e.g., two thirds of the pixel count included in the image partition, and may be configured according to the actual need in practical applications.

Optionally, the S-shaped curve encompasses various kinds of backlight adjusting curves, each with a different S curvature. Optionally, the brightness distribution information and the backlight adjusting curve may have such a mapping in between that enables the apparatus for controlling backlight brightness to determine, in the S-shaped curve, the backlight adjusting curve corresponding to the brightness distribution information according to the mapping.

When the number of the pixels in the image partition having a grayscale value greater than the second grayscale value is greater than the second threshold value, most pixels in the image partition are high brightness images, thus a larger part of the image details are of high brightness. By adjusting the backlight values for the backlight partitions through the S-shaped curve, bright details in the backlight partition can be fully presented, and the image displaying effect can be enhanced, meanwhile, dynamic contrast can be further improved by reducing backlight brightness for the backlight partitions with low brightness.

Now, a detailed description will be given to the method of the embodiment shown in FIG. 7.

In an example 1 where an Image Partition 1 is assumed to be an image of a starry sky, when the apparatus for controlling backlight brightness needs to determine the backlight adjusting curve for the backlight partition corresponding to the Image Partition 1, the apparatus for controlling backlight brightness obtains the grayscale histogram of the Image Partition 1 as presumably shown in FIG. 8*a*.

FIG. 8*a* is a first grayscale histogram according to the present application, in which the horizontal axis represents the grayscale values, and the vertical axis represents the pixel count. As can be seen from FIG. 8*a*, a larger portion of the pixels in the image partition associated with the grayscale histogram have low grayscale values. That is, the Image Partition 1 (or the starry sky image) is generally disposed towards being dark, and details in the starry sky image are thus disposed towards being fuzzy. For instance, many of the stars appear fuzzy on the starry sky image.

The apparatus for controlling backlight brightness determines the brightness distribution information for the Image Partition 1 (or the starry sky image) according to the grayscale histogram thereof. Since the Image Partition 1 as a whole inclines towards duskiness, the reverse S-shaped curve is determined to be the type of the backlight adjusting curve, and based on the brightness distribution information of the Image Partition 1, the backlight adjusting curve corresponding to the brightness distribution information is determined in the reverse S-shaped curve, where the reverse S-shaped curve may be as illustrated in FIG. 8*b*.

Figure 8B:
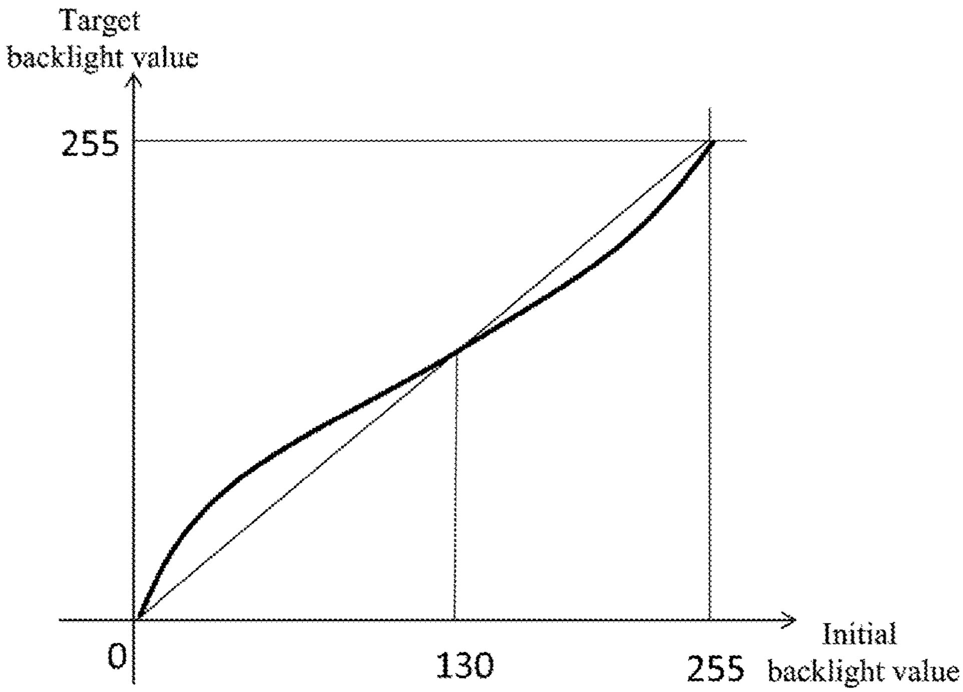
FIG. 8*b* is a reverse S-shaped curve according to the present application.

FIG. 8*b* is a reverse S-shaped curve according to the present application. In the reverse S-shaped curve illustrated in FIG. 8*b*, the horizontal axis represents initial backlight values of the backlight partitions, and the vertical axis represents target backlight values thereof. As can be seen from FIG. 8*b*, the reverse S-shaped curve increases the backlight values for those backlight partitions in the Image Partition 1 (i.e. the starry sky image) with a backlight value below the first backlight value (e.g. 130), and decreases the backlight values for those backlight partitions in the starry sky image with a backlight value above the first backlight value (e.g. 130). After adjusting the initial backlight values for the backlight partitions according to the reverse S-shaped curve, the starry sky in the starry sky image will be increased in brightness, which enhances the display of details in the starry sky image, allowing the stars in the starry sky to appear more clearly.

In an example 2 where an Image Partition 2 is assumed to be an image of plants in daylight, when the apparatus for controlling backlight brightness needs to determine the backlight adjusting curve for the backlight partition corresponding to the Image Partition 2, the apparatus for controlling backlight brightness obtains the grayscale histogram of the Image Partition 2 as presumably shown in FIG. 9*a*.

FIG. 9*a* is a second grayscale histogram according to the present application, in which the horizontal axis represents the grayscale values, and the vertical axis represents the pixel count. As can be seen from FIG. 9*a*, a larger portion of the pixels in the image partition associated with the grayscale histogram have low grayscale values. That is, the Image Partition 2 (or the plants image) is generally disposed towards being bright, which means details in the plants image are already sufficiently displayed. At this time, contrast of the plants image can be increased, so as to optimize the displaying effect for the plants image.

The apparatus for controlling backlight brightness determines the brightness distribution information for the Image Partition 2 (or the plants image) according to the grayscale histogram thereof. Since the Image Partition 2 as a whole inclines towards brightness, the S-shaped curve is determined to be the type of the backlight adjusting curve, and based on the brightness distribution information of the Image Partition 2, the backlight adjusting curve corresponding to the brightness distribution information is determined in the S-shaped curve, where the S-shaped curve may be as illustrated in FIG. 9*b*.

FIG. 9*b* is an S-shaped curve according to the present application. In the S-shaped curve illustrated in FIG. 9*b*, the horizontal axis represents initial backlight values of the backlight partitions, and the vertical axis represents target backlight values thereof. As can be seen from FIG. 9*b*, the S-shaped curve reduces the backlight values for those backlight partitions in the Image Partition 1 (i.e. the plants image) with a backlight value below the first backlight value (e.g. 180), and increases the backlight values for those backlight partitions in the starry sky image with a backlight value above the first backlight value (e.g. 180). After adjusting the initial backlight values for the backlight partitions according to the S-shaped curve, contrast of the plants image has been increased, which makes the plants in the plants image look more gorgeous, thus optimizing the displaying effect for the plants image.

During the aforementioned process, the grayscale values for the pixels in the image partition can demonstrate the image type (e.g. generally disposed towards duskiness, brightness or the like) of this image partition, and individual image types are associated with corresponding backlight adjusting curves. By adjusting the initial backlight values for each backlight partition according to the corresponding backlight adjusting curve, adjustments can be realized for the initial backlight value of the backlight partition corresponding to the image partition according to the image type of the image partition. Thus, the target backlight value obtained through the adjustments can be matched to the image type, thereby improving the displaying effect for the image.

Figure 10:
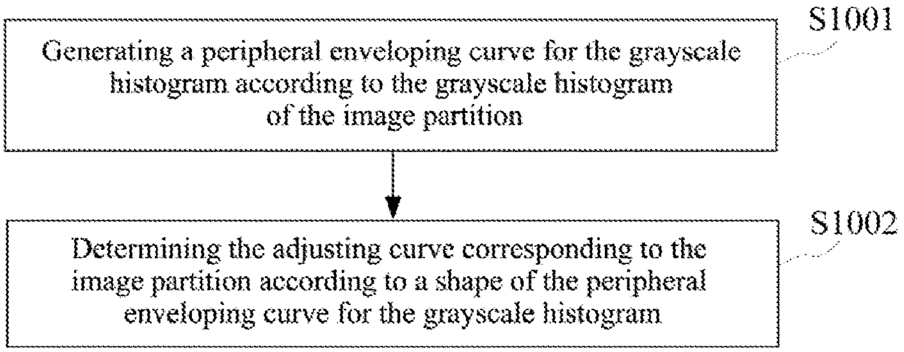
FIG. 10 is a second flowchart of a method for determining a backlight adjusting curve according to the present application.

FIG. 10 is a second flowchart of a method for determining a backlight adjusting curve according to the present application. Referring to FIG. 10, the method may include:

S1001: generating a peripheral enveloping curve for the grayscale histogram according to the grayscale histogram of the image partition; and

S1002: determining the adjusting curve corresponding to the image partition according to a shape of the peripheral enveloping curve for the grayscale histogram.

In the embodiment shown in FIG. 10, when the adjusting curve for the image partition needs to be determined, a grayscale histogram for the image partition is obtained at first, and a peripheral enveloping curve is generated for the grayscale histogram according to the grayscale histogram of the image partition. Optionally, the peripheral enveloping curve can be obtained by smoothing upper curves that indicate pixel counts in individual brightness ranges for the grayscale histogram.

After determining the peripheral enveloping curve for the grayscale histogram, determining the adjusting curve corresponding to the image partition according to the shape of the peripheral enveloping curve for the grayscale histogram. Optionally, a mapping may be pre-configured between the peripheral enveloping curve and the adjusting curve, so that the adjusting curve corresponding to the peripheral enveloping curve can be determined according to the mapping. Optionally, if a peripheral enveloping curve for a grayscale histogram starts from high and ends at low, which shows more pixels are distributed in the low brightness ranges. Accordingly, a reverse S-shaped curve will be the grayscale adjusting curve for the grayscale histogram. If a peripheral enveloping curve for a grayscale histogram starts from low and ends at high, which shows more pixels are distributed in the high brightness ranges. Accordingly, an S-shaped curve will be the grayscale adjusting curve for the grayscale histogram. If a peripheral enveloping curve for a grayscale histogram appears to be balanced (i.e. starts from and ends at similar heights), which shows the pixels are relatively evenly distributed among all brightness ranges. Accordingly, curve-based adjustment for the backlight values may be unnecessary for the backlight partitions corresponding to the image partition.

Now, a detailed description will be given to the method of the embodiment shown in FIG. 10.

Illustratively, assuming that the grayscale histogram of an image partition is as shown in FIG. 8*a*, accordingly, it can be determined that the peripheral enveloping curve for the grayscale histogram is as shown by Enveloping Curve a. Since the enveloping curve starts from high and ends at low, it means more pixels are distributed in the low brightness ranges. Therefore, based on the shape of the Enveloping Curve a, it can be determined that the adjusting curve corresponding to the image partition is the reverse S-shaped curve illustrated in FIG. 8*b*.

Assuming that the grayscale histogram of an image partition is as shown in FIG. 9*a*, accordingly, it can be determined that the peripheral enveloping curve for the grayscale histogram is as shown by Enveloping Curve b. Since the enveloping curve starts from low and ends at high, it means more pixels are distributed in the high brightness ranges. Therefore, based on the shape of the Enveloping Curve b, it can be determined that the adjusting curve corresponding to the image partition is the S-shaped curve illustrated in FIG. 9*b*.

Assuming that the grayscale histogram of an image partition is as shown in FIG. 9*c*, accordingly, it can be determined that the peripheral enveloping curve for the grayscale histogram is as shown by Enveloping Curve c. Since the Enveloping Curve c is generally balanced (a straight line), it means the pixels are relatively evenly distributed among all brightness ranges, and the backlight values can be left unadjusted.

On the basis of any of the aforementioned embodiments, optionally, after being determined and obtained, the target backlight value for the backlight partition corresponding to the image partition may further be sent to a corresponding driving circuit for the backlight partition corresponding to the image partition, so as to cause the corresponding driving circuit to adjust backlight source brightness for the backlight partition corresponding to the image partition according to the target backlight value. Where the adjusting the backlight source brightness for the backlight partition can be realized through the driving circuit shown in FIG. 11.

Figure 11:
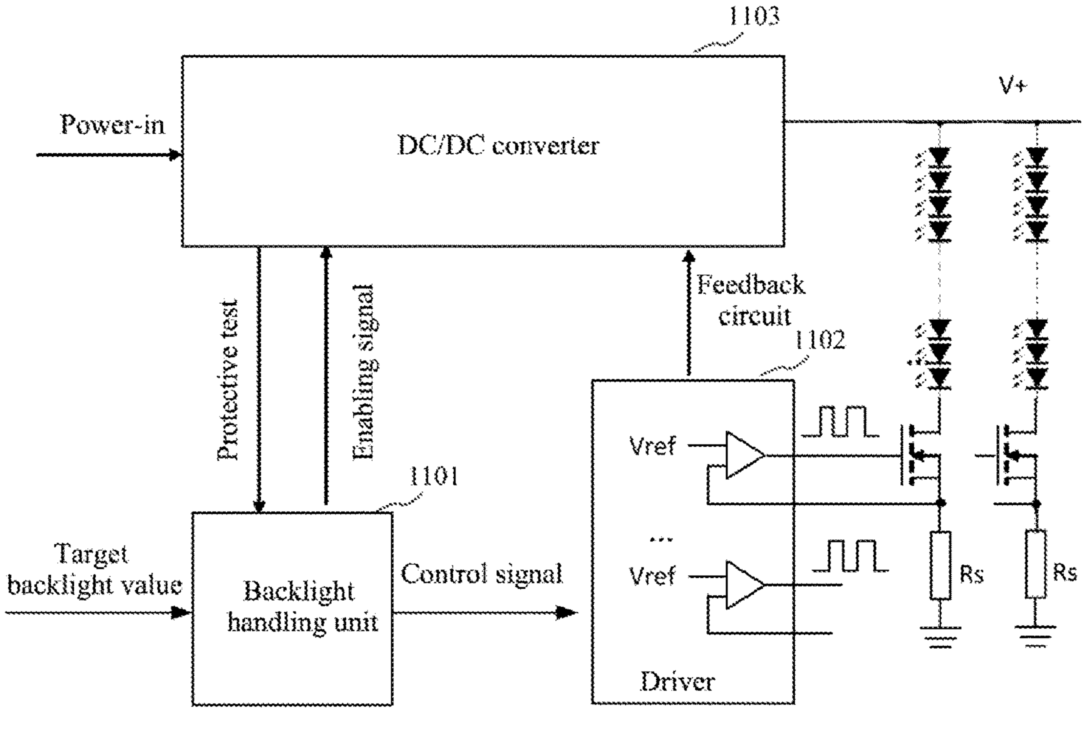
FIG. 11 is a schematic structural diagram of a backlight driving circuit according to the present application.

FIG. 11 is a schematic structural diagram of a backlight driving circuit according to the present application. Referring to FIG. 11, there includes a backlight handling unit 1101, a driver 1102, and a DC/DC converter 1103, where:

After determining the target backlight values, the apparatus for controlling backlight brightness sends the same to the backlight handling unit 1101. The backlight handling unit 1101 processes the target backlight values to obtain a control signal, and sends the same to the driver 1102, causing the driver 1102 to control, according to the control signal, a conductivity of a MOS transistor connected with LED string lights, thus controlling the actual backlight unit to produce the brightness corresponding to the backlight data. Optionally, the control signal may be a pulse width modulation (PWM) signal, or a current signal, and different types of control signals will be generated by the backlight handling unit 1101 through different processes, which may include two possible implementations as follows:

one of the possible implementations is: the control signal is PWM signal.

In this possible implementation, the backlight handling unit 1101 receives a target backlight value, and accordingly determines a duty ratio for the PWM signal in such a way that higher target backlight value leads to larger duty ratio for the PWM signal. Accordingly, having received the duty ratio for the PWM signal, the controller 1102 outputs a control command to the actual backlight unit according to the duty ratio, so as to control the conductivity of the MOS transistor connected with the LED string lights, thus controlling the actual backlight unit to produce the brightness corresponding to the backlight data. When the controller controls the actual backlight unit to produce the brightness corresponding to the backlight data according to the PWM duty ratio, an amplitude of the PWM signal may be a predefined value, that is, the actual output current may be predefined.

Another possible implementations is: the control signal is a current signal.

In this possible implementation, after receiving a target backlight value, the backlight handling unit 1101 generates the current signal accordingly. Accordingly, the controller 1102 adjusts the actual output current according to the current signal and a predefined reference voltage Vref, thereby controlling the actual backlight unit to produce the brightness corresponding to the backlight data, and when under the same duty ratio, higher output current leads to higher backlight brightness. The actual output current Iout=(current data/Imax) (Vref/Rs), where Vref is a predefined reference voltage, e.g. 500 mV, and Rs is a sampling resistor corresponding to a current from downstream of the MOS transistor at, e.g., 1 Ohm. The current data is typically configured by operating registers in a PWM controller. If the register has a bit-width of 10 bits, the equation will have Imax=1024. Thus, the current data can be calculated according to the actually needed Iout request. For instance, if the needed current is 250 mA, the current data will need to be set at 512 according to the above mentioned equation. A PWM controller is typically created by cascading multiple integrated circuits (IC), with each IC driving multiple PWM signals to output to the LED string lights.

The DC/DC converter 1103 is used for converting a voltage input from a power source into a voltage required by the LED string lights, maintaining a stable voltage based on a feedback from a feedback circuit, and performing protective tests on the backlight handling unit. After being set up running, the backlight handling unit can send an enabling signal to the DC/DC converter, so that the DC/DC converter begins protective tests for the backlight handling unit to prevent an overvoltage or an overcurrent.

Figure 12:
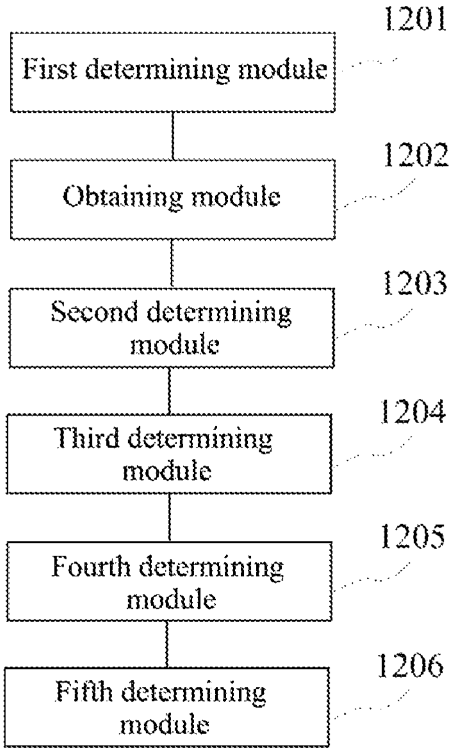
FIG. 12 is a first schematic structural diagram of an apparatus for controlling backlight brightness according to the present application.

FIG. 12 is a first schematic structural diagram of an apparatus for controlling backlight brightness according to the present application. Referring to FIG. 12, the apparatus may include:

a first determining module 1201, configured to determine, in an image to be displayed, an image block corresponding to each backlight partition of a plurality of backlight partitions, and determine an initial backlight value for each backlight partition according to grayscale values of pixels in the image block corresponding to the backlight partition;

a obtaining module 1202, configured to obtain multiple image partitions corresponding to the image to be displayed;

a second determining module 1203, configured to determine brightness distribution information for the pixels in each image partition according to grayscale values of the pixels in the each image partition;

a third determining module 1204, configured to determine backlight adjusting curves corresponding to the each image partition according to the brightness distribution information for the pixels in the each image partition, where the backlight adjusting curve records a mapping between the initial backlight value and a backlight adjusting factor;

a fourth determining module 1205, configured to determine backlight adjusting factors for each backlight partition corresponding to the image partition according to the initial backlight value of the backlight partitions corresponding to the image partition and the backlight adjusting curve corresponding to the image partition; and a fifth determining module 1206, configured to determine target backlight values for the backlight partitions according to the initial backlight values for the backlight partitions and the corresponding backlight adjusting factors.

The apparatus for controlling backlight brightness shown in this embodiment of the present application is capable of carrying out the technical solution shown in the foregoing method embodiments following similar implementation principals and producing similar advantageous effects, neither of which will be repeated herein.

In a possible implementation, the third determining module 1204 is configured to:

determine a backlight adjusting factor corresponding to each brightness range according to the number of pixels corresponding to the each brightness range in the brightness distribution information; and determine the backlight adjusting curve corresponding to the image partition according to the backlight adjusting factor corresponding to each brightness range.

In another possible implementation, the first determining module 1201 is configured to:

determine the grayscale value for the image block corresponding to the backlight partition according to the grayscale values of the pixels in the image block corresponding to the backlight partition; and determine the initial backlight value for the backlight partition according to the grayscale value for the image block corresponding to the backlight partition, the initial backlight value is proportional to the grayscale value for the image block corresponding to the backlight partition.

In yet another possible implementation, the obtaining module 1202 is configured to:

obtain a division rule corresponding to a backlight assembly, where the division rule is configured to indicate the number of image partitions corresponding to the image to be displayed and the number of backlight partitions corresponding to an image partition respectively along a horizontal direction and a vertical direction, where the number of the backlight partitions corresponding to the image partition along the horizontal direction is greater than one, or the number of the backlight partitions corresponding to the image partition along the vertical direction is greater than one; and partition the image to be displayed to obtain the multiple image partitions according to the division rule.

In yet another possible implementation, the second determining 1203 is configured to:

determine a grayscale histogram for the image partition according to the grayscale values of the pixels in the image partition; and determine the brightness distribution information according to the grayscale histogram.

In yet another possible implementation, the fourth determining 1205 is configured to:

count the number of pixels corresponding to each grayscale value according to the grayscale histogram of the image partition;

determine that the backlight adjusting curve corresponding to the image partition is of a reverse S-shaped curve type if the number of pixels in the image partition having a grayscale value smaller than a first grayscale value is greater than a first threshold value, and determining, in the reverse S-shaped curve, the backlight adjusting curve corresponding to the brightness distribution information, wherein the reverse S-shaped curve is configured to increase a backlight value for a backlight partition having a backlight value smaller than a first backlight value, and to decrease a backlight value for a backlight partition having a backlight value greater than a second backlight value; or determine that the backlight adjusting curve corresponding to the image partition is of a S-shaped curve type if the number of pixels in the image partition having a grayscale value greater than a second grayscale value is greater than a second threshold value; and determining, in the S-shaped curve, the backlight adjusting curve corresponding to the brightness distribution information, wherein the S-shaped curve is configured to increase a backlight value for a backlight partition having a backlight value greater than a third backlight value, and to decrease a backlight value for a backlight partition having a backlight value smaller than a fourth backlight value.

In yet another implementation, the third determining 1024 is configured to:

generate a peripheral enveloping curve for the grayscale histogram according to the grayscale histogram of the image partition; and determine the adjusting curve corresponding to the image partition according to a shape of the peripheral enveloping curve for the grayscale histogram.

In yet another implementation, the fifth determining 1206 is configured to:

determine the target backlight value for the backlight partition to be a product of the initial backlight value for the backlight partition and the corresponding backlight adjusting factor.

Figure 13:
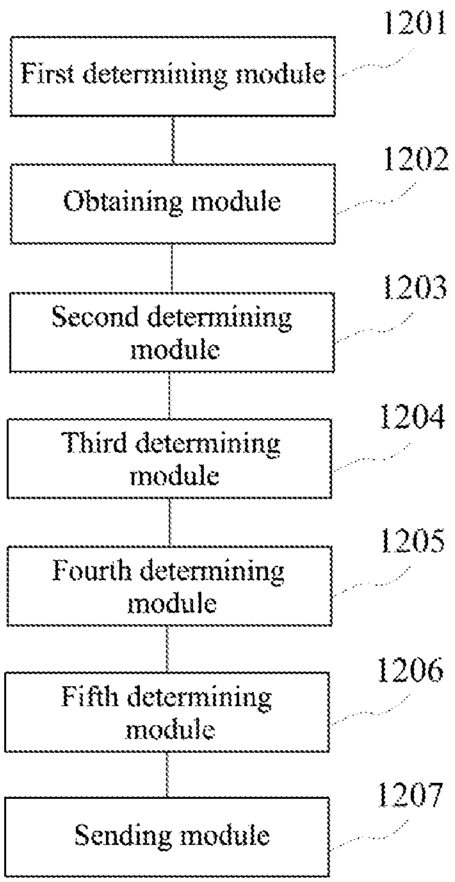
FIG. 13 is a second schematic structural diagram of an apparatus for controlling backlight brightness according to the present application.

FIG. 13 is a second schematic structural diagram of an apparatus for controlling backlight brightness according to the present application. On the basis of the embodiment illustrated in FIG. 12, referring to FIG. 13, the apparatus further includes a sending module 1207, where:

the sending module 1207 is configured to: after the fifth determining module 1206 determines the target backlight value for the backlight partition according to the initial backlight value for the backlight partition and the corresponding backlight adjusting factor, send the target backlight value for the backlight partition to a corresponding driving circuit for the backlight partition, so that the corresponding driving circuit adjusts backlight source brightness for the backlight partition according to the target backlight value.

The apparatus for controlling backlight brightness shown in this embodiment of the present application is capable of carrying out the technical solution shown in the foregoing method embodiments following similar implementation principals and producing similar advantageous effects, neither of which will be repeated herein.

Embodiments of this application further provide an apparatus for controlling backlight brightness, including: a memory storing instructions; a processor coupled with the memory and configured to execute instructions stored in the memory, and the processor is configured to: determine, in an image to be displayed, an image block corresponding to each backlight partition of a plurality of backlight partitions, and determine an initial backlight value for each backlight partition according to grayscale values of pixels in the image block corresponding to the backlight partition; determine brightness distribution information for pixels in an image partition according to grayscale values of the pixels in the image partition corresponding to the image to be displayed; determine a backlight adjusting curve corresponding to the image partition according to the brightness distribution information for the pixels in the image partition, where the backlight adjusting curve records a mapping between the initial backlight value and a backlight adjusting factor; and determine a backlight adjusting factor for a backlight partition corresponding to the image partition according to the initial backlight value of the backlight partition corresponding to the image partition and the backlight adjusting curve corresponding to the image partition, and determine a target backlight value for the backlight partition corresponding to the image partition according to the initial backlight value for the backlight partition and the corresponding backlight adjusting factor.

The processor in the apparatus for controlling backlight brightness shown in this embodiment of the present application is capable of carrying out the technical solution shown in the foregoing method embodiments following similar implementation principals and producing similar advantageous effects, neither of which will be repeated herein.

Figure 14:
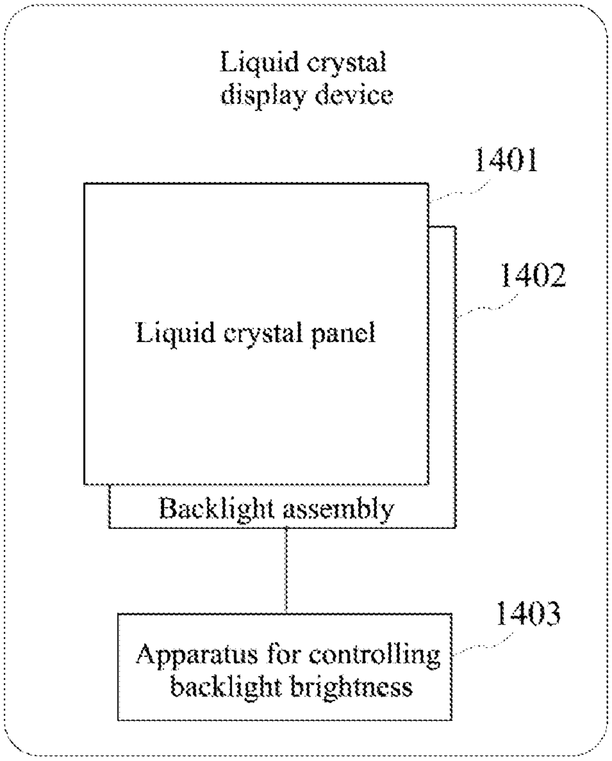
FIG. 14 is a schematic structural diagram of a liquid crystal display device according to the present application.

FIG. 14 is a schematic structural diagram of a liquid crystal display device according to the present application. Referring to FIG. 14, the liquid crystal display device includes a liquid crystal panel 1401, a backlight assembly 1402, and an apparatus for controlling backlight brightness 1403 described in embodiments of FIGS. 12 and 13, where the apparatus for controlling backlight brightness is configured to control brightness of backlight sources for backlight partitions in the backlight assembly, so that the backlight partitions in the backlight assembly illuminates the liquid crystal panel according to the corresponding backlight source brightness.

Additionally, the liquid crystal display device may further include other components, such as memories, controllers, controlling circuits and the like, which will not be described herein.

Those skilled in the art may understand that all or part of the steps in the methods of the embodiments can be implemented by hardware under instructions. The instructions may be stored in a computer readable storage medium and when the instructions are executed, the steps in the methods of the embodiments are performed. The storage medium may be any medium that can store a program code, including a read-only memory (ROM), a random access memory (RAM), a floppy disk, or an optical disk, etc.

Finally, it should be noted that the foregoing embodiments are merely intended for describing the technical solutions of the present application rather than limiting the present application. Although the present application is described in detail with reference to the foregoing embodiments, persons of ordinary skill in the art should understand that they may still make modifications to the technical solutions described in the foregoing embodiments or make equivalent substitutions to some technical features thereof, without departing from the spirit and scope of the technical solutions of embodiments of the present application.

What is claimed is:

1. A method for controlling backlight brightness, comprising:

determining, in an image to be displayed, an image block corresponding to a backlight partition of a plurality of backlight partitions, and determining an initial backlight value for the backlight partition according to grayscale values of pixels in the image block;

determining brightness distribution information for pixels in the image block according to grayscale values of the pixels in the image block;

determining that a backlight adjusting curve corresponding to the image block is of a reverse S-shaped curve type when the brightness distribution information indicates that number of pixels in the image block having grayscale values smaller than a first grayscale value is greater than a first threshold value, wherein the backlight adjusting curve of the reverse S-shaped curve type is configured to increase the initial backlight value to a target backlight value for the backlight partition corresponding to the image block when the initial backlight value is smaller than a first initial backlight value, and to decrease the initial backlight value to the target backlight value for the backlight partition corresponding to the image block when the initial backlight value is greater than a second initial backlight value;

determining that the backlight adjusting curve corresponding to the image block is of a S-shaped curve type when the brightness distribution information indicates that number of pixels in the image block having grayscale values greater than a second grayscale value is greater than a second threshold value, wherein the backlight adjusting curve of the S-shaped curve type is configured to increase the initial backlight value to the target backlight value for the backlight partition corresponding to the image block when the initial backlight value is greater than a third initial backlight value, and to decrease the initial backlight value to the target backlight value for the backlight partition corresponding to the image block when the initial backlight value is smaller than a fourth initial backlight value; and determining a backlight adjusting factor for the backlight partition corresponding to the image block according to the initial backlight value of the backlight partition corresponding to the image block and the backlight adjusting curve corresponding to the image block, and determining the target backlight value for the backlight partition corresponding to the image block according to the initial backlight value for the backlight partition and the backlight adjusting factor.

2. The method according to claim 1 wherein the determining the initial backlight value for the backlight partition according to the grayscale values of the pixels in the image block comprises:

determining the grayscale value for the image block corresponding to the backlight partition according to the grayscale values of the pixels in the image block corresponding to the backlight partition; and determining the initial backlight value for the backlight partition according to the grayscale value for the image block corresponding to the backlight partition, wherein the initial backlight value is proportional to the grayscale value for the image block corresponding to the backlight partition.

3. The method according to claim 1, wherein the image to be displayed comprises multiple image blocks;

wherein before the determining the brightness distribution information for the pixels in the image block according to grayscale values of the pixels in the image block, the method further comprises:

obtaining a division rule corresponding to a backlight assembly, wherein the division rule is configured to indicate a number of image blocks corresponding to the image to be displayed and numbers of backlight partitions corresponding to one image block respectively along a horizontal direction and a vertical direction, wherein the number of the backlight partitions corresponding to the image block along the horizontal direction is greater than one, or the number of the backlight partitions corresponding to the image block along the vertical direction is greater than one; and partitioning the image to be displayed to obtain the multiple image blocks according to the division rule.

4. The method according to claim 1, wherein the determining brightness distribution information for the pixels in the image block according to the grayscale values of the pixels in the image block comprises:

generating a grayscale-histogram of numbers of pixels of the image block falling into a predetermined number of grayscale bins of a predetermined bin size; and determining the brightness distribution information according to the grayscale histogram.

5. The method according to claim 1, after the determining the target backlight value for the backlight partition corresponding to the image block according to the initial backlight value for the backlight partition and the corresponding backlight adjusting factor, further comprising:

sending the target backlight value for the backlight partition corresponding to the image block to a corresponding driving circuit for the backlight partition corresponding to the image block, so that the corresponding driving circuit adjusts backlight source brightness for the backlight partition corresponding to the image block according to the target backlight value.

6. The method according to claim 1, wherein the image block corresponds to one backlight partition.

7. The method according to claim 1, wherein the image block corresponds to multiple backlight partitions.

8. A method for controlling backlight brightness, comprising:

determining, in an image to be displayed, an image block corresponding to a backlight partition of a plurality of backlight partitions, and determining an initial backlight value for each backlight partition according to grayscale values of pixels in the image block corresponding to the backlight partition;

determining brightness distribution information for pixels in the image block according to grayscale values of the pixels in the image block;

generating a peripheral enveloping curve for a grayscale histogram of numbers of pixels of the image block falling into a predetermined number of grayscale value bins with a predetermined bin size;

determining a backlight adjusting curve corresponding to the image block according to a shape of the peripheral enveloping curve for the grayscale histogram; and determining a backlight adjusting factor for the backlight partition corresponding to the image block according to the initial backlight value of the backlight partition corresponding to the image block and the backlight adjusting curve corresponding to the image block, and determining a target backlight value for the backlight partition corresponding to the image block according to the initial backlight value for the backlight partition and the corresponding backlight adjusting factor.

9. A liquid crystal display device, comprising a liquid crystal panel, a backlight assembly, and an apparatus for controlling backlight brightness, wherein the apparatus for controlling backlight brightness is configured to control backlight source brightness for backlight partitions in the backlight assembly, so that the backlight partitions in the backlight assembly illuminate the liquid crystal panel according to the corresponding backlight source brightness; and the apparatus for controlling backlight brightness comprises: a memory storing instructions; a processor coupled with the memory and configured to execute instructions stored in the memory, and the processor is configured to:

determine, in an image to be displayed, an image block corresponding to a backlight partition of a plurality of backlight partitions, and determine an initial backlight value for the backlight partition according to grayscale values of pixels in the image block;

determine brightness distribution information for pixels in the image block according to grayscale values of the pixels in the image block;

determine that a backlight adjusting curve corresponding to the image block is of a reverse S-shaped curve type when the brightness distribution information indicates that number of pixels in the image block having grayscale values smaller than a first grayscale value is greater than a first threshold value, wherein the backlight adjusting curve of the reverse S-shaped curve type is configured to increase the initial backlight value to a target backlight value for the backlight partition corresponding to the image block when the initial backlight value is smaller than a first initial backlight value, and to decrease the initial backlight value to the target backlight value for the backlight partition corresponding to the image block when the initial backlight value is greater than a second initial backlight value;

determine that the backlight adjusting curve corresponding to the image block is of a S-shaped curve type when the brightness distribution information indicates that number of pixels in the image block having grayscale values greater than a second grayscale value is greater than a second threshold value, wherein the backlight adjusting curve of the S-shaped curve type is configured to increase the initial backlight value to the target backlight value for the backlight partition corresponding to the image block when the initial backlight value is greater than a third initial backlight value, and to decrease the initial backlight value to the target backlight value for the backlight partition corresponding to the image block when the initial backlight value is smaller than a fourth initial backlight value; and determine a backlight adjusting factor for the backlight partition corresponding to the image block according to the initial backlight value of the backlight partition corresponding to the image block and the backlight adjusting curve corresponding to the image block, and determine the target backlight value for the backlight partition corresponding to the image block according to the initial backlight value for the backlight partition and the corresponding backlight adjusting factor.

10. A liquid crystal display device, comprising a liquid crystal panel, a backlight assembly, and an apparatus for controlling backlight brightness, wherein the apparatus for controlling backlight brightness is configured to control backlight source brightness for backlight partitions in the backlight assembly, so that the backlight partitions in the backlight assembly illuminate the liquid crystal panel according to the corresponding backlight source brightness; and the apparatus for controlling backlight brightness comprises: a memory storing instructions; a processor coupled with the memory and configured to execute instructions stored in the memory, and the processor is configured to:

determine, in an image to be displayed, an image block corresponding to each backlight partition of a plurality of backlight partitions, and determine an initial backlight value for each backlight partition according to grayscale values of pixels in the image block corresponding to the backlight partition;

determine brightness distribution information for pixels in the image block according to grayscale values of the pixels in the image block;

generate a peripheral enveloping curve for a grayscale histogram of numbers of pixels of the image block falling into a predetermined number of grayscale value bins with a predetermined bin size;

determine the backlight adjusting curve corresponding to the image block according to a shape of the peripheral enveloping curve for the grayscale histogram; and determine a backlight adjusting factor for the backlight partition corresponding to the image block according to the initial backlight value of the backlight partition corresponding to the image block and the backlight adjusting curve corresponding to the image block, and determine a target backlight value for the backlight partition corresponding to the image block according to the initial backlight value for the backlight partition and the corresponding backlight adjusting factor.

* * * * *